(12) United States Patent
Campbell

(10) Patent No.: US 8,608,109 B2
(45) Date of Patent: Dec. 17, 2013

(54) PAYLOAD USE OF WING TO BODY VOLUME IN AN ELLIPTICAL FUSELAGE

(75) Inventor: Lowell B. Campbell, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 74 days.

(21) Appl. No.: 13/293,958

(22) Filed: Nov. 10, 2011

(65) Prior Publication Data

US 2013/0119198 A1 May 16, 2013

(51) Int. Cl.
*B64C 11/00* (2006.01)

(52) U.S. Cl.
USPC ...................... 244/118.5; 244/119; 244/118.1

(58) Field of Classification Search
USPC ....................................................... 244/118.5
See application file for complete search history.

(56) References Cited

U.S. PATENT DOCUMENTS

| | | | |
|---|---|---|---|
| 3,405,893 A | 10/1968 | Flamand et al. | |
| 3,854,679 A * | 12/1974 | Smethers, Jr. | 244/106 |
| 4,674,712 A * | 6/1987 | Whitener et al. | 244/119 |
| 5,086,996 A * | 2/1992 | Roeder et al. | 244/119 |
| 5,769,358 A * | 6/1998 | Hahl et al. | 244/36 |
| 6,047,923 A * | 4/2000 | Lafferty | 244/15 |
| 6,394,392 B1 * | 5/2002 | Lafferty | 244/118.1 |
| 7,621,482 B2 * | 11/2009 | Sankrithi et al. | 244/119 |
| 7,842,147 B2 | 11/2010 | Shen et al. | |
| 8,292,226 B2 * | 10/2012 | Sankrithi et al. | 244/119 |
| 8,403,256 B1 * | 3/2013 | Gregg et al. | 244/45 R |
| 2004/0195454 A1 * | 10/2004 | Page et al. | 244/120 |
| 2005/0167546 A1 * | 8/2005 | Jones et al. | 244/118.5 |
| 2005/0178912 A1 * | 8/2005 | Whelan et al. | 244/120 |
| 2006/0232609 A1 * | 10/2006 | Humphries | 345/659 |
| 2007/0215746 A1 * | 9/2007 | Rieken et al. | 244/6 |
| 2009/0134273 A1 * | 5/2009 | Page et al. | 244/63 |
| 2010/0200697 A1 * | 8/2010 | Sankrithi et al. | 244/119 |
| 2011/0121130 A1 * | 5/2011 | Odle et al. | 244/36 |
| 2011/0220758 A1 | 9/2011 | Cazals et al. | |
| 2012/0138736 A1 * | 6/2012 | Cazals et al. | 244/54 |
| 2013/0062457 A1 * | 3/2013 | Deakin | 244/25 |

FOREIGN PATENT DOCUMENTS

| | | |
|---|---|---|
| CH | 700723 B1 | 10/2010 |
| GB | 1397068 | 6/1975 |
| WO | WO9743176 A1 | 11/1997 |

OTHER PUBLICATIONS

Liebeck, R.H., "Design of the Blended Wing Body Subsonic Transport" Journal of Aircraft, AIAA, vol. 41, No. 1, Jan. 1, 2004, pp. 10-25.

* cited by examiner

*Primary Examiner* — Christopher P Ellis
*Assistant Examiner* — Medhat Badawi
(74) *Attorney, Agent, or Firm* — Felix L. Fischer

(57) ABSTRACT

An aircraft passenger cabin in an aircraft fuselage wherein an upper portion of the cabin volume is a substantially elliptical cross section and a lower portion of the cabin volume is a cross section extending laterally into a blended area of the wing and fuselage typically referred to as a wing to body fairing.

18 Claims, 10 Drawing Sheets

PAYLOAD USE OF WING TO BODY VOLUME IN AN ELLIPTICAL FUSELAGE

BACKGROUND INFORMATION

1. Field

Embodiments of the disclosure relate generally to the field of aircraft fuselage design and more particularly to a fuselage having substantially elliptical cross section and planform integrating available volume in wing to body aerodynamic fairings for additional payload volume.

2. Background

Use of composite structures in aircraft fuselages is allowing significant flexibility in design to accommodate alternative aerodynamic and structural configurations. Medium sized aircraft are widely used to carry at least 100 passengers and their baggage on flights usually of multiple hour duration, but are also often used for short flights between islands or congested metropolitan regions. Redesign of aircraft in this class to maximize passenger loading capability and provide desirable baggage compartment locations and accessibility while improving aerodynamic performance with reduced wetted area for fuel efficiency and cost savings is advantageous.

It is therefore desirable to provide a structural design for a medium sized aircraft fuselage having reduced wetted area with maximum volume.

SUMMARY

Embodiments disclosed herein provide an aircraft passenger cabin in a fuselage wherein an upper portion of the cabin volume is a substantially elliptical cross section and a lower portion of the cabin volume is a cross section extending laterally into a blended area of the wing and fuselage typically referred to as a wing to body fairing.

In one example a passenger airplane incorporates a fuselage accommodating an interior pressurized passenger cabin containing a plurality of rows of passenger seats. The fuselage has an upper cross section shape and lower cross section shape defining a fuselage structural shell. The upper cross section shape has a non-circular, elliptical cross section. The lower cross section shape contains a pressurized volume within the wing to body fairing that is integrated into the interior pressurized passenger cabin. The wings are advantageously coupled to the lower cross section to create a substantially rectangular pressurized volume while also beneficially distributing a portion of the flight loads into the structure of the upper section The disclosed embodiment further provide an aircraft passenger cabin in a fuselage having an upper volume with a substantially elliptical cross section, and a lower volume having a cross section extending laterally into a wing to body fairing.

This embodiment is envisioned to be the basis for a person skilled in the art to derive designs of smaller and also significantly larger capacity by simultaneously modifying the major axis of the ellipse in the Y axis and also the X axis while the Z axis shape remains substantially unchanged. The features, functions, and advantages that have been discussed can be achieved independently in various embodiments of the present disclosure or may be combined in yet other embodiments further details of which can be seen with reference to the following description and drawings. The example embodiment discloses an aircraft of approximately 175 passengers.

DETAILED DESCRIPTION

Embodiments disclosed herein provide a novel interior arrangement in a mid-sized elliptical fuselage airplane using a pressurized volume in the wing-to-body (WTB) fairing to permit a wide-body multi aisle seating arrangement in a medium sized aircraft typically used for regional routes. The configuration provides reduced wetted area of the airframe while keeping the same payloads volume and a desired ground height since the fuselage shape can be made shorter and wider. The outboard portion of a highly elliptical fuselage cross section is not suitable for passenger seating. However, by incorporating a portion of the WTB fairing volume within the passenger compartment, extended space becomes available which is usable for additional seating. This is, in effect, an integration of the several factors of elliptical fuselage cross section and plan form, extension of pressurized payload volume into WTB, blended wing with forward strake aerodynamic surfaces, and thick core sandwich primary structure to produce a uniquely successful airplane of high aerodynamic and structural efficiency and compatibility with multiple large diameter fuel efficient propulsion systems.

Figure 1:
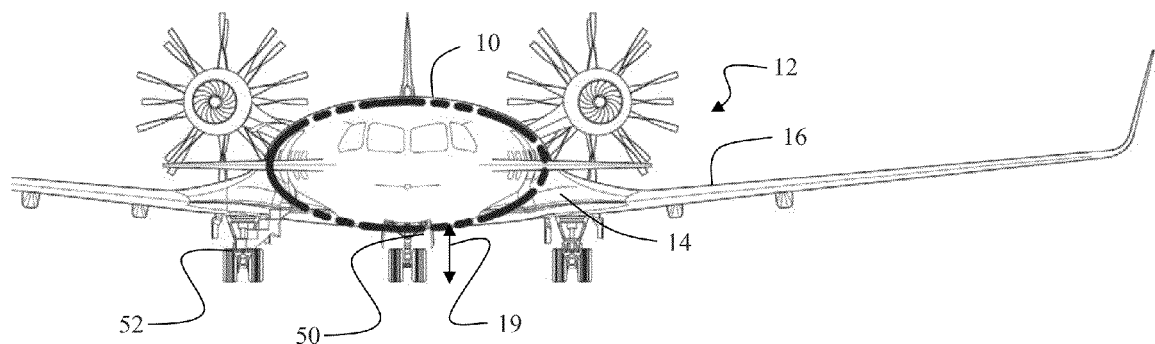
FIG. 1 is a front view of an aircraft employing an example embodiment.
Figure 2:
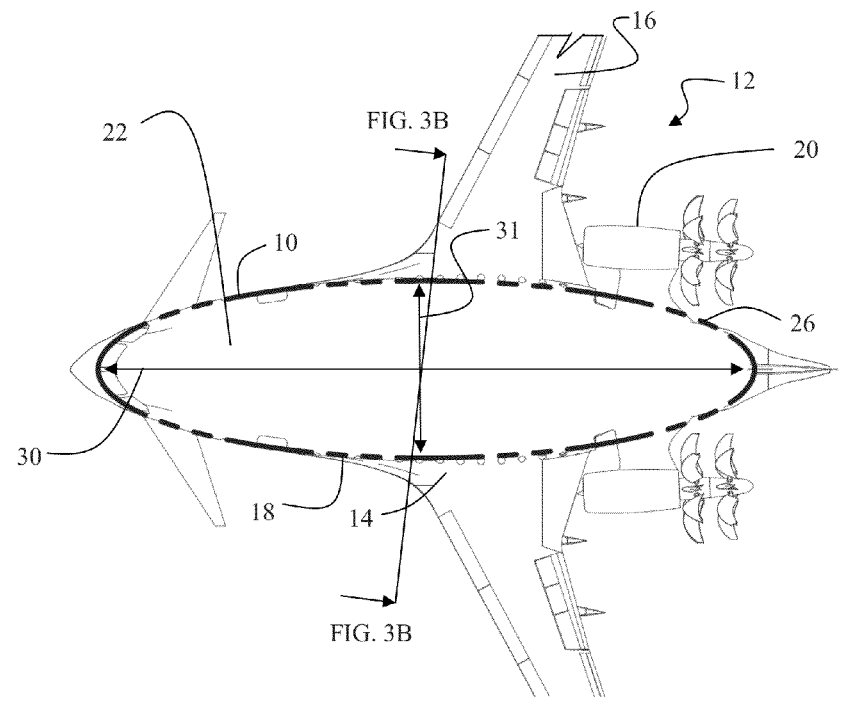
FIG. 2 is a top view of the embodiment.

As seen in FIGS. 1 and 2, fuselage 10 of aircraft 12 has a substantially elliptical cross-section and planform which is distinct from conventional circular cylindrical fuselages in present commercial aircraft. A wing to fuselage interface employing fairings 14 blends the shape of fuselage 10 into the shape of the wings 16 extending from the fuselage in a conventional manner. The fairings 14 extend forward of the wings in strakes 18 for aerodynamic shaping establishing a blended wing body (BWB) configuration. The shorter and wider shape of the dual elliptical fuselage form allows wetted area of the airframe to be reduced while keeping the same payloads volume and a desired lower ground height 19. For the embodiment shown, the two main propulsion engines 20 attach adjacent to the fuselage aft of the main occupied cabin 22 in order to provide improved perceived noise level and rotor-burst safety, and to allow versatility in engine choice including such designs as a 14' diameter unducted fan (UDF or Propfan) or a geared turbofan (GTF) class 10' diameter propulsion engine without requiring an increase in the ground height of the wing or fuselage.

As shown in FIGS. 3A, 3B, 4 and 5, the fuselage basic shape approximates both a near-elliptical cross-section 24 and a near-elliptical plan-form 26 for a structural shell. The cross section elliptical major axis 28 is more than two (2) times the minor axis 29, the major axis being horizontal and the minor axis being vertical. Similarly, the plan-form major axis 30 is more than two times the minor axis 31, the major axis being longitudinal length and the minor axis being lateral width.

Figure 6:
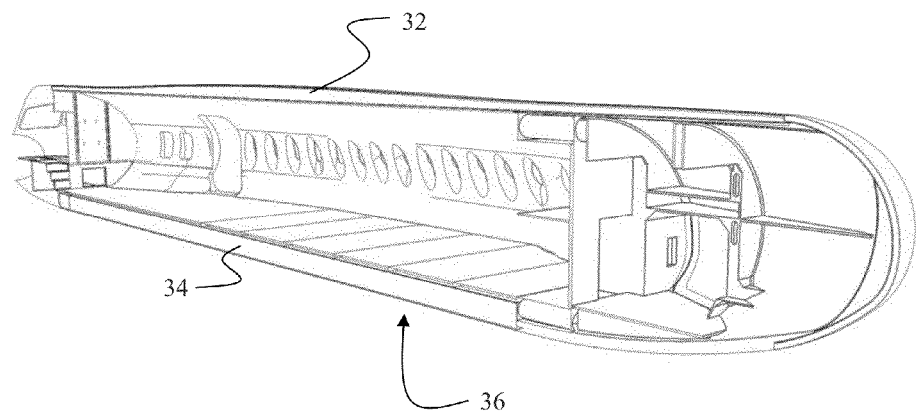
FIG. 6 is an isometric side section view of an example fuselage half employing the described embodiment.

Preferred structural embodiments employ both sandwich structure and a primary load carrying structure employing a single crown longeron 32 and a single keel longeron 34 instead of a conventional skin-stringer structure. Structural joining with a longitudinal splice at the fuselage keel and crown instead of circular splices as in a conventional aircraft fuselage enhances the joint strength and also more effectively serves alternate purposes for energy absorbing deformation loads, gust loads and other structural requirements. The crown longeron 32 and keel longeron 34 act as the webs of structural crown and keel beams 33 and 35 where the inner and outer layers of composite materials act as the load bearing flanges. The crown beam 33 and keel beam 35 beneficially distribute loads along the main cabin in the longitudinal direction. As shown in FIG. 6, for an example embodiment fuselage half sections 36 are fabricated and then bonded at the crown and keel.

As will be described in greater detail subsequently, for the example embodiment the aircraft primary structure is composed of a structural outer skin, a very thick and lightweight core, and a structural inner skin. The outer carbon fiber reinforced polymer (CFRP) skin 37 defines the outer mold line (OML) of the aircraft and is smooth without longitudinal (X axis) manufacturing breaks and also without through fasteners to additional support frames and stringers found on currently available aircraft. The outer skin has integrated inboard thickness increases where necessary for window and door cutouts, and local reinforcement for antennae and tear stops which incorporate a thickened band on the fuselage. If a tear begins, it will eventually get to one of the thickened bands and the tear will not continue to grow in length. A core 38 for an example embodiment is made of a strong and lightweight fiberglass honeycomb which is milled to the exact surface profile required to match the inner and outer skins. Multiple milled blocks of honeycomb are joined with septum sheets as required to contiguously fill the entire fuselage half section 36. The honeycomb interstitials are beneficially filled with foam to prevent moisture ingress. An inner carbon fiber reinforced polymer (CFRP) skin 39 defines the inner mold line (IML) of the aircraft interior and is the smooth surface immediately adjacent to the aircraft payload. The door and window surrounding structure is bonded to the inner and outer skins to act similar to the webs of the longerons to bridge structural loads. The skin buildup and crown/keel longerons form a structural shell having the substantially elliptical planform and cross section with an upper elliptical portion and a lower laterally extended portion in the passenger cabin adjacent the WTB fairings.

Figure 3A:
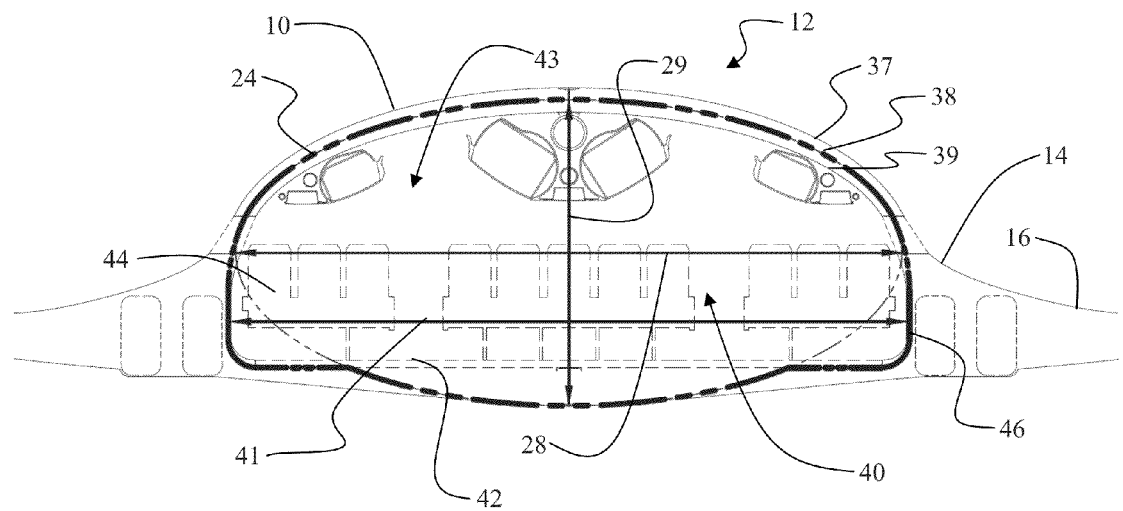
FIG. 3A is a front section view of the embodiment at the minor planform elliptical axis.
Figure 5:
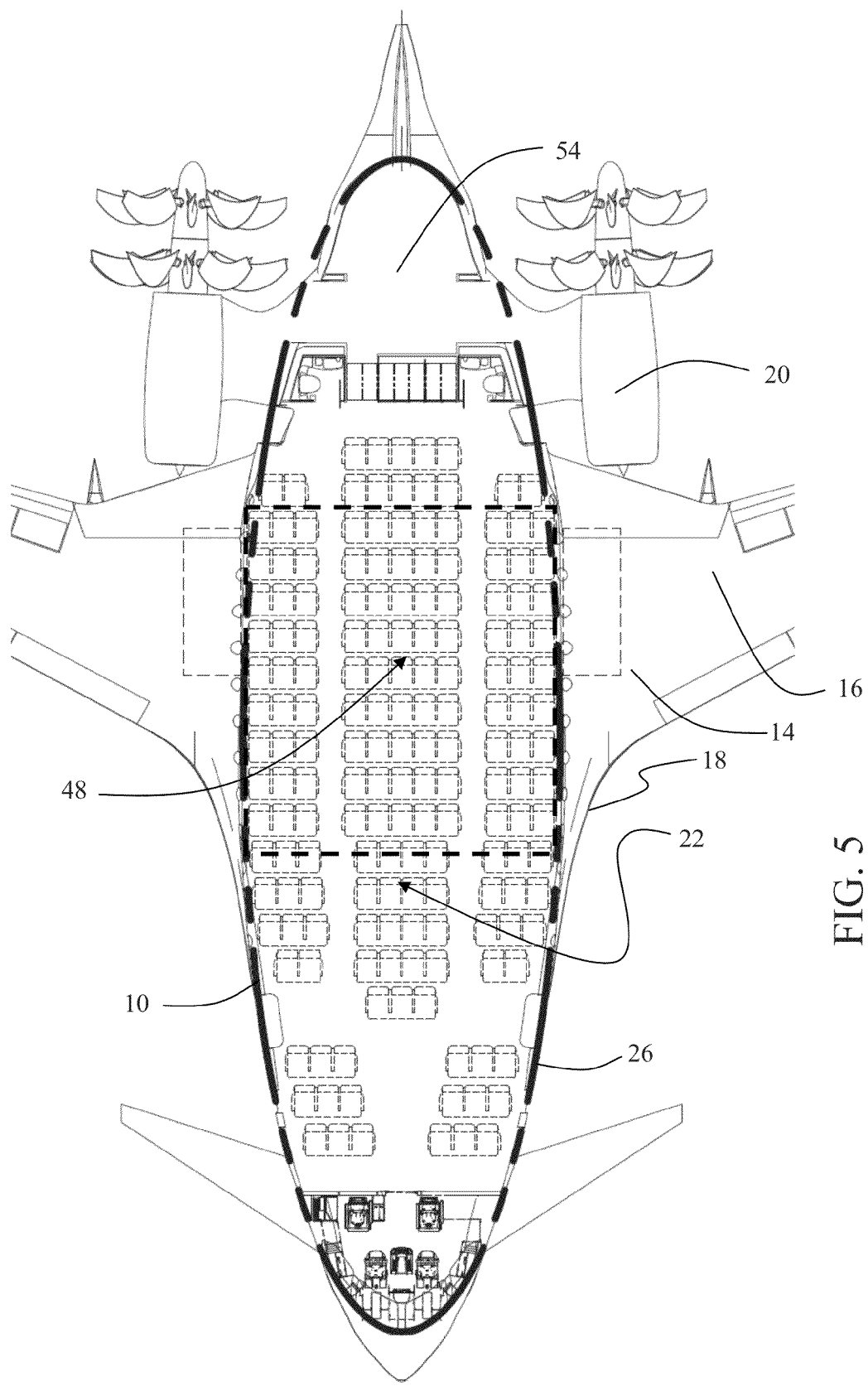
FIG. 5 is a top section view of the embodiment.

The volume of the WTB fairing 14 is integrated into the aircraft cabin for pressurized payload such that an example overall cross-section 40 of the lower portion of the passenger compartment shown in FIG. 3A extends downward in a substantially squared corner allowing the width 41 of compartment floor 42 to be approximately the same or greater than the major axis 28. The passenger compartment cross section in the portion of the fuselage adjacent the WTB fairings is substantially elliptical above the major axis for an upper cross section 43 and substantially rectangular below the major axis for the lower cross section 40. This allows more passenger seats or other payloads to be arranged within the same aircraft wetted area. As seen in FIG. 3A if the elliptical section 24 limited the usable area, outboard seats 44 could not be installed. By extending the interior cabin sidewall downward within the WTB fairing profile for laterally extended volume shown by profile 46 the outboard seats 44 may be installed. The volumetric capacity of the fuselage is further optimized by the confluence of the position of the arcuate portion of the planform ellipse about the extent of minor axis 29 within the longitudinal length of the WTB fairings. For the embodiment as shown in FIG. 5, a 3-5-3 seating arrangement can be accommodated in the laterally extended portion (generally designated 48 in FIG. 5) of the cabin 22 adjacent the WTB fairings. A substantially squared corner is shown for the example embodiment. Further lateral extension of the cabin beyond the major axis of the elliptical planform by extending the sidewall into the area of the fairing for the lower cross section shown by profile 49 in FIG. 3B could allow additional floor mounted baggage storage compartments adjacent the outboard seats 44 or other cabin interior space usage.

The highly elliptical fuselage allows a twin aisle aircraft with a main compartment floor in close proximity to the keel to provide improved ground access for payloads loading and unloading and maintenance. For the example embodiment of a medium sized aircraft shown in FIGS. 3A, 3B, 4 and 5, the substantially flat floor of the passenger compartment is approximately 66 to 70 inches above ground level. Nose landing gear 50 and main landing gear 52 may be comparable to current 100 passenger aircraft in length and may further enhance the desired low keel height by having a kneeling capability. The additional volume available in WTB fairings 14 provides retraction volume for the main landing gear which is advantageously arranged outside of and adjacent to the pressurized expanded volume so as to avoid the common problem of a decrease in the space available for beneficial main cabin use, while allowing the minimum wetted area and profile of the aircraft. The kneeling main landing gear can be beneficially arranged to allow substantially more vertical movement for absorption of landing loads than is commonly available on existing medium sized passenger aircraft and also a simple and substantially vertical retraction path.

Figure 4:
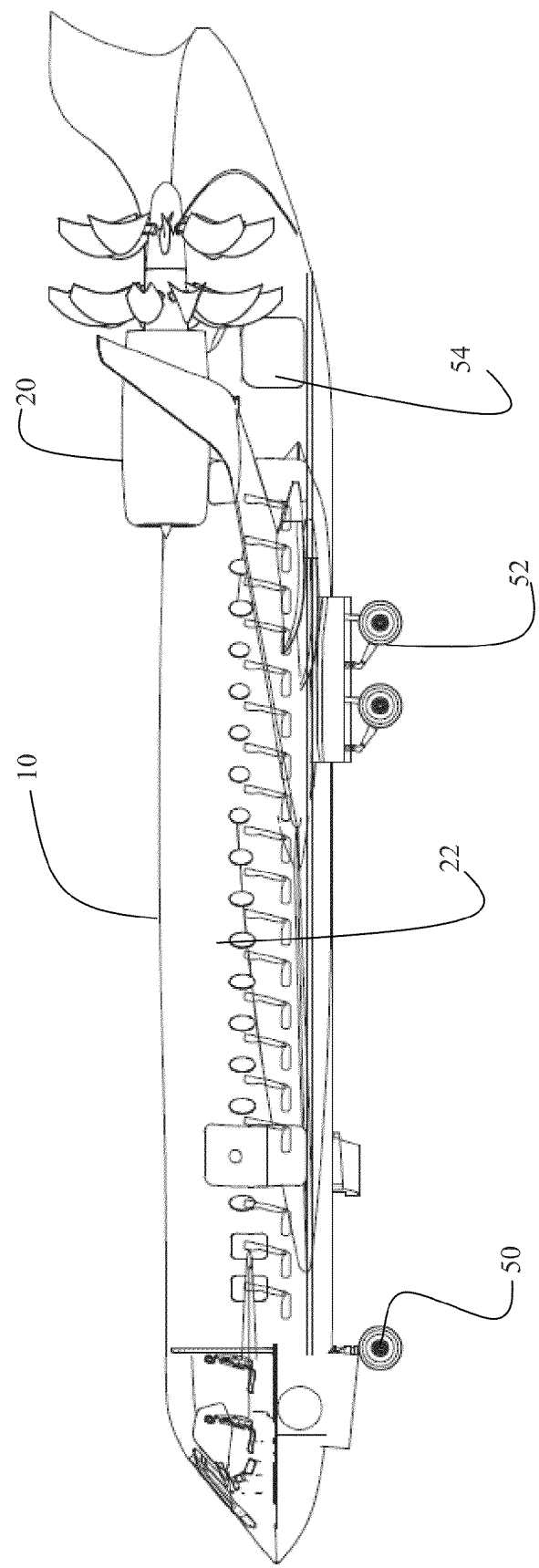
FIG. 4 is a side section view of the embodiment.

As seen in FIGS. 4 and 5, the cargo compartment 54 is located aft of the main occupied cabin 22 similar to the arrangement used on many smaller regional aircraft. A further benefit of this arrangement is to locate the main propulsion engines adjacent to the section of the fuselage aft of the main occupied cabin and adjacent the cargo compartment in order to provide improved perceived noise level and rotor-burst safety, and to allow a very large diameter propulsion engine 20 (e.g. 10' dia. GTF) without requiring an increase in the height of the wing or fuselage.

Figure 3B:
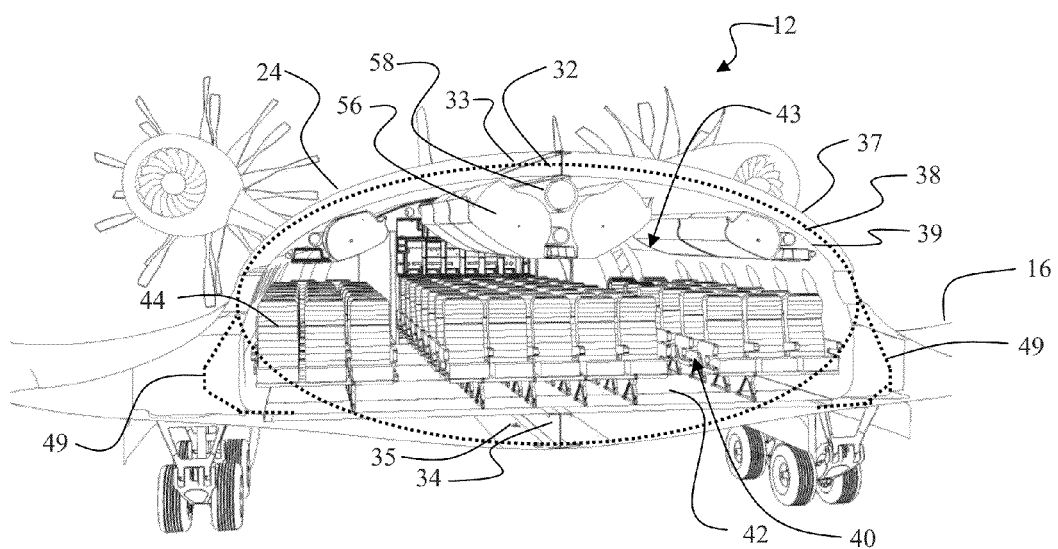
FIG. 3B is a front oblique section view of the embodiment along line FIG. 3B-FIG. 3B in FIG. 2.

As also seen in FIGS. 3A and 3B shaping of the fuselage as described has significant beneficial effect in the overall usability and efficiency of the passenger cabin area. The structure of the crown longeron 32 is highly compatible with placement and structural support of internal baggage stowage bins 56 and other aircraft systems routing such as ventilation ducting 58. The rectangular lower cross section 43 supported by the keel longeron 34 allows the floor 41 to be substantially flat for at least the entire width of the laterally extended cabin portion 48.

Figure 7:
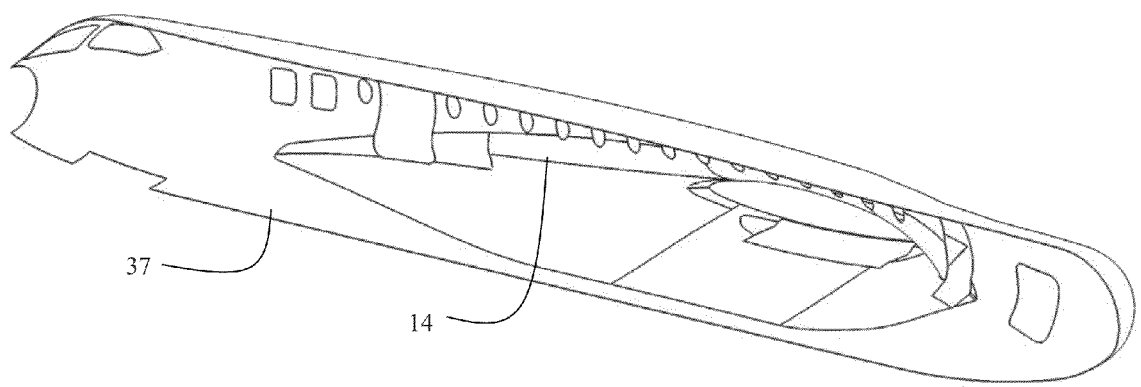
FIG. 7 is an isometric view of an outer skin.
Figure 8:
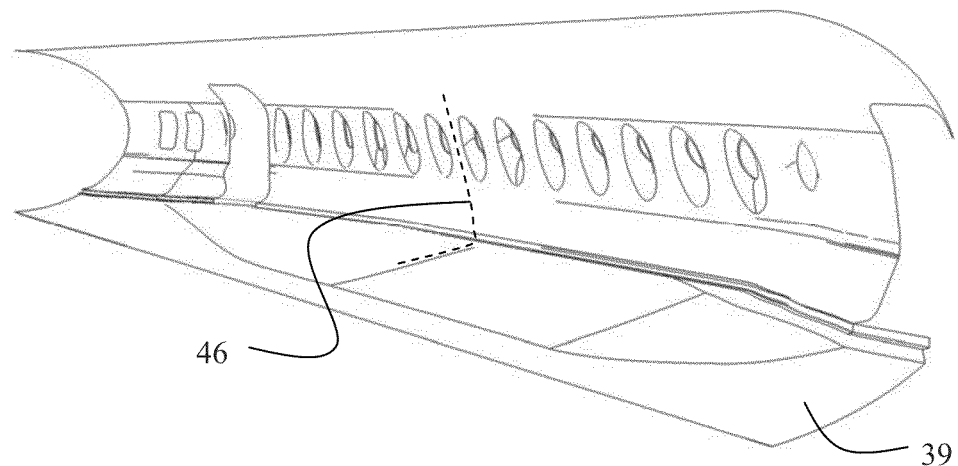
FIG. 8 is an isometric view of an inner skin.
Figure 9A:
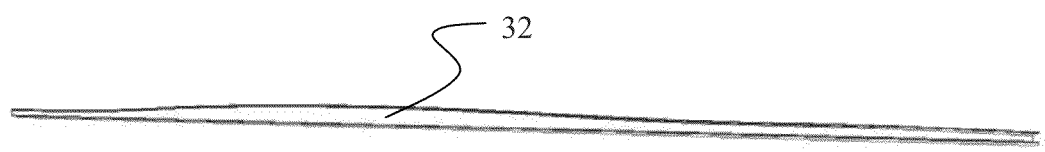
FIGS. 9A-9H are isometric views of major structural components for assembly with the inner and outer skin.
Figure 9B:
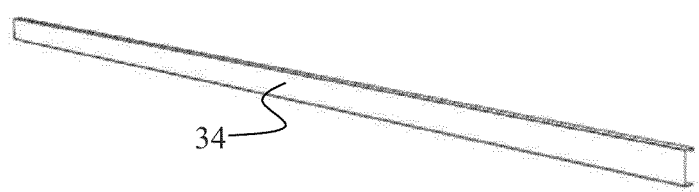
Figure 9C:
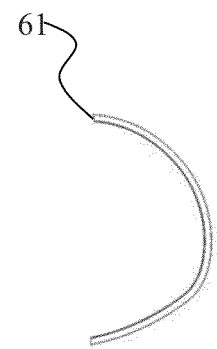
Figure 9D:
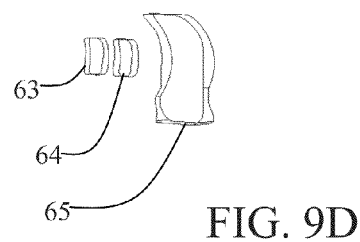
Figure 9E:
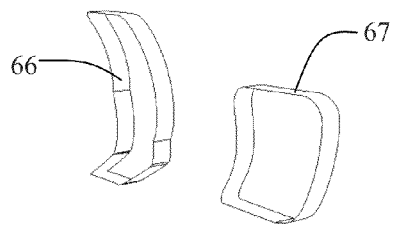
Figure 9F:
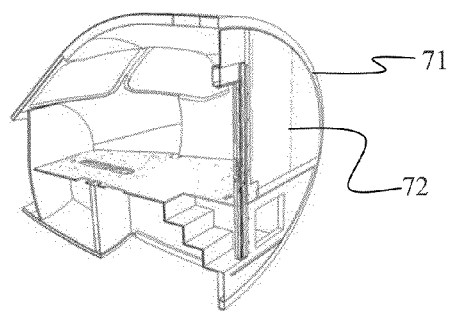
Figure 9G:
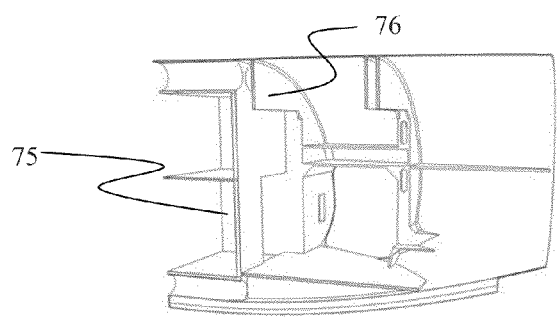
Figure 9H:
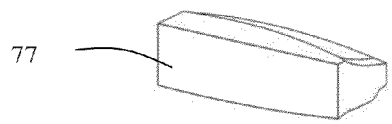

For fabrication of the major structural components of an exemplary embodiment of the aircraft fuselage having laterally extended pressurized volume in the WTB fairing as described, the outer skin, the thick core, and the inner skin are bonded to create a single, monolithic structure. An exemplary embodiment of the method described with respect to FIGS. 7, 8, 9A-9H, 10A, 10B, for visualization of the components and FIG. 11 as a flowchart uses existing technology tape laying machines to compressively apply a plurality of tailored plies of high strength CFRP composite to a rigid tooling mandrel, which is then covered with a semi-flexible caul plate with release agents. The mandrel and caul plate tooling for the OML outer skin 37 and the IML inner skin 39 have door and window cutouts beneficially arranged with rigid features for alignment of subsequent components as shown in FIGS. 7 and 8. Each of the components has a Left Hand and Right Hand manifestation using tooling mirrored about the buttline 0 (BL0) centerline plane. The major structural components including OML Outer Skin 37 including WTB fairing 14, IML inner skin 39 including WTB volume extension 49 shown in FIGS. 7 and 8, crown longeron 32, FIG. 9A, keel longeron 34, FIG. 9B, aft pressure bulkhead (APB) BL0 rib 61, FIG. 9C, door surrounds 63, 64, 65, 66, 67, FIGS. 9D and 9E, composite build up flight deck half 71 including flight deck bulkhead (FDBH) 72, FIG. 9F, composite build up aft galley half 75 including cargo region surround structure 76, FIG. 9G, and composite build up main landing gear wheel well 77 (MLGWW), FIG. 9H are fabricated with the multi-part mandrels on the interior concave surface, and the caul plates on the outermost surface, step 1102.

The CFRP parts are individually cured using either normal autoclave equipment or compression heat blanket equipment. Removing the various parts from both the mandrel and caul is only partially completed, allowing the Inner Skin IML mandrel tooling to become a rigid datum for the multiple other parts to be beneficially combined in the post cure bonding process, step 1104. The caul plates are removed from the Inner Skin 39, FDBH 71, Aft Galley 75 and MLGWW 77. The mandrels are removed from the Outer Skin 37, the Longerons 32 and 34, the APB rib 61, and Door Surrounds 63, 64, 65, 66, 67.

Each mating surface is exposed and prepared for adhesive bonding, step 1106, and then coated with bonding compound, typically epoxy, step 1108. Prefabricated segments of fiberglass honeycomb core 38 coated with an unexpanded thermo-expandable material are milled to match a 4" to 7" designed gap between the outer skin 37 and inner skin 39 and other components listed above, step 1110. Exemplary material for the core 38 is disclosed in U.S. Pat. No. 7,842,147 to Gill. The milled honeycomb segments are arranged on the cured inner skin 39 surface with the longitudinal axis of the cells oriented radially from the longitudinal axis of the airplane, perpendicular to the inner skin and outer skin surfaces, step 1112. The density and structural properties of each core segment match the required loading or each region of the fuselage assembly. Using existing techniques known to those familiar with the art such as use of alignment pins and manual or hydraulic overcenter clamps, the components are rigidly and accurately aligned such that the core material is completely enclosed, step 1114. The locked assembly is heated to both cure the bonding compound and also to expand the thermally activated foaming agent within the core cell interstitial spaces, step 1116.

Figure 10A:
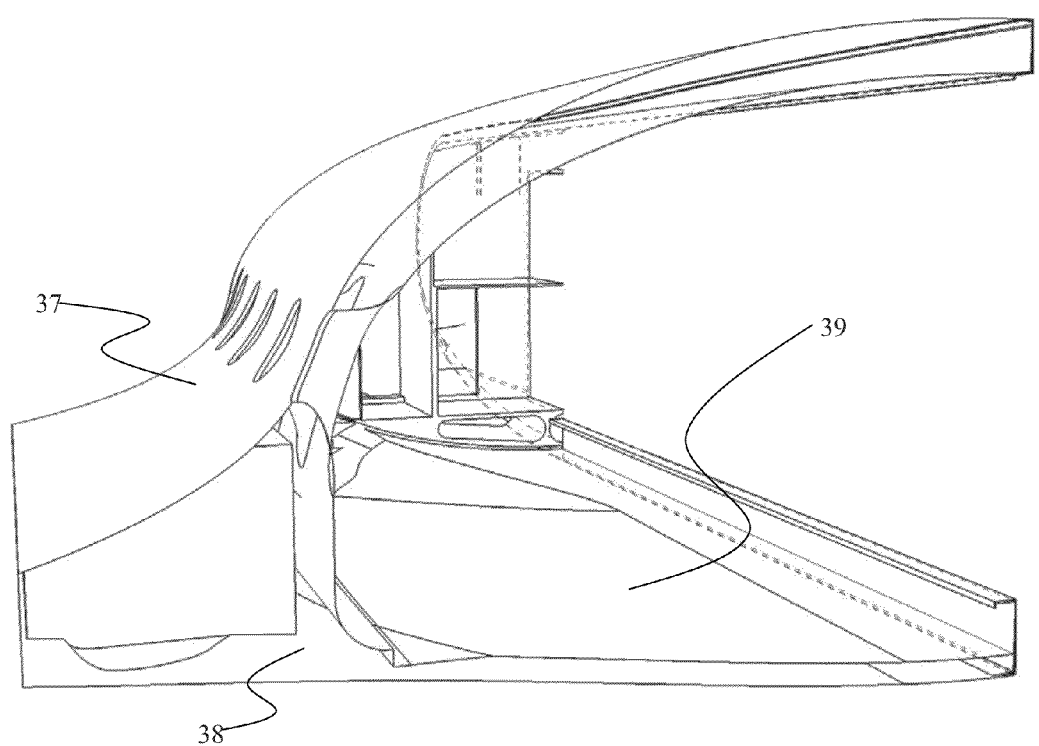
FIGS. 10A and 10B are section views of the assembled components.
Figure 10B:
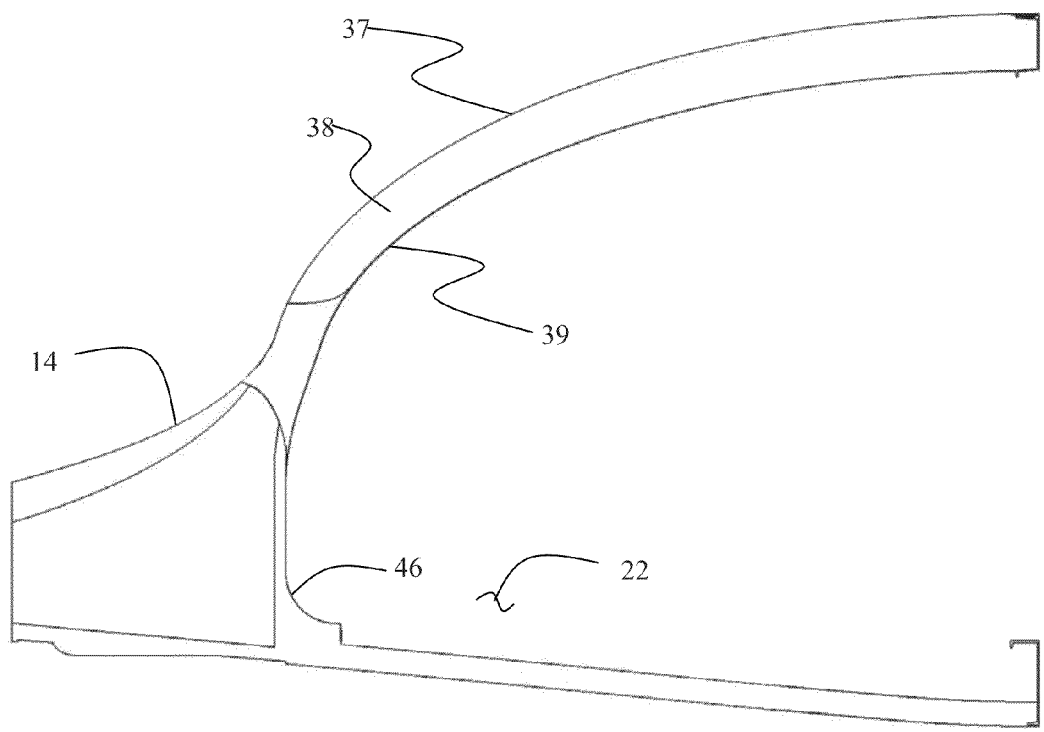
Figure 11:
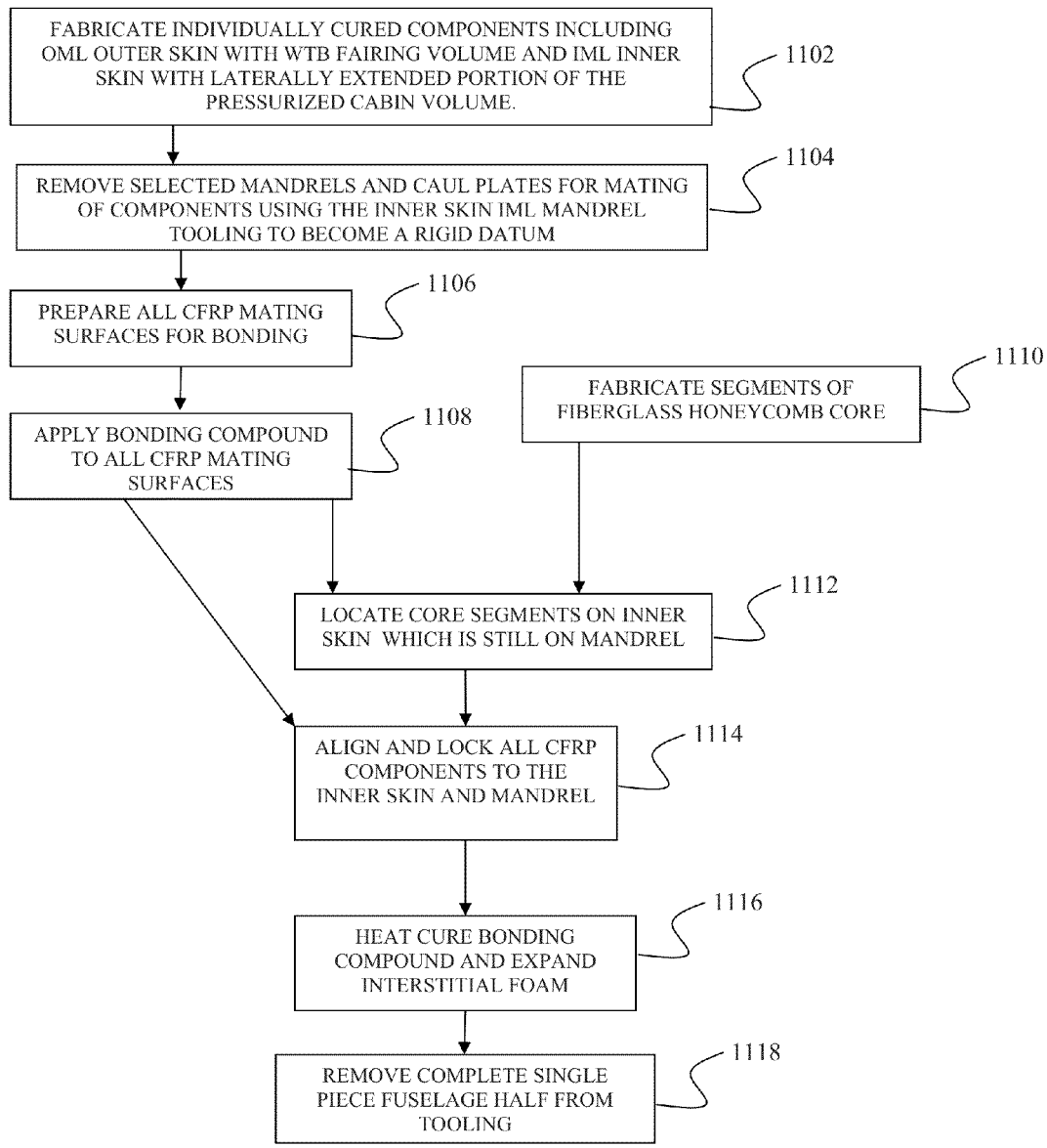
FIG. 11 is a flow chart of an exemplary fabrication method for the skins and components.

The resulting one-piece fuselage half section 36 is then removed from the tooling, step 118. As shown in FIGS. 10A and 10B The fuselage half section has beneficially integrated the outer aerodynamic skin 37, the intermediate core 38 providing depth of section, and a structural inner skin 39 which is the interior lining of the passenger area 22 including the volume extension 39 provided by the extension into the WTB fairing 14. The monocoque construction has inherent damage tolerance, duplicate load paths, foam filled interstitial space to prevent moisture ingress, and noise and thermal insulation, while providing the essential purpose of a structure which carries all flight loads and which simultaneously provides an irregular elliptical shaped membrane capable of holding internal pressurization without additional stiffening.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A passenger airplane comprising:
   a fuselage accommodating an interior pressurized passenger cabin containing a plurality of rows of passenger seats;
   said fuselage having an upper cross section shape and a lower cross section shape defining a fuselage structural shell,
   said upper cross section shape having a non-circular, elliptical cross section;
   said lower cross section shape comprising an enlargement of a lower portion of the pressurized passenger cabin to provide passenger seating up to the major diameter of the elliptical cross section;
   wings coupled to said lower cross section shape at a wing-to-body interface having a wing to body fairing;
   said wing to body fairing containing a pressurized volume that is integrated into the lower cross section shape as part of the interior pressurized passenger cabin.

2. The passenger airplane of claim 1 wherein the non-circular elliptical cross section has a horizontal major axis greater than two (2) times a vertical minor axis.

3. The passenger airplane of claim 1 further comprising main landing gear and nose landing gear, and at least two engines, wherein the main landing gear is beneficially located outside of and adjacent to the pressurized volume for beneficial main cabin use and within the minimum wetted area and profile of the aircraft.

4. The passenger airplane of claim 1, wherein a floor of the passenger cabin is between 66 to 70 inches above ground level when the main and nose landing gears are deployed.

5. The passenger airplane of claim 1 wherein the enlargement of the lower portion of the pressurized passenger cabin extends beyond a major diameter of the elliptical cross section.

6. The passenger airplane of claim 1 wherein the fuselage has a substantially elliptical planform.

7. The passenger airplane of claim 6 wherein a major axis of the substantially elliptical planform is greater than two times a minor axis of the substantially elliptical planform.

8. The passenger airplane of claim 6 wherein a minor axis of the elliptical planform terminates adjacent the wing to body fairing.

9. A passenger airplane comprising:
   a fuselage accommodating an interior pressurized passenger cabin containing a plurality of rows of passenger seats;
   said fuselage having an upper cross section shape and a lower cross section shape defining a fuselage structural shell,
   said upper cross section shape having a non-circular, elliptical cross section wherein the fuselage incorporates a single crown longeron;
   wings coupled to said lower cross section shape at a wing-to-body interface having a wing to body fairing;
   said wing to body fairing containing a pressurized volume that is integrated into the lower cross section shape as part of the interior pressurized passenger cabin.

10. A passenger airplane comprising:
a fuselage accommodating an interior pressurized passenger cabin containing a plurality of rows of passenger seats;
said fuselage having an upper cross section shape and a lower cross section shape defining a fuselage structural shell wherein the fuselage incorporates a single keel longeron,
said upper cross section shape having a non-circular, elliptical cross section;
wings coupled to said lower cross section shape at a wing-to-body interface having a wing to body fairing;
said wing to body fairing containing a pressurized volume that is integrated into the lower cross section shape as part of the interior pressurized passenger cabin.

11. The passenger airplane of claim 1 wherein a baggage compartment is aft of an occupied portion of the passenger cabin.

12. The passenger airplane of claim 1 wherein engines are mounted to the fuselage adjacent the baggage compartment.

13. An aircraft passenger cabin in a fuselage comprising:
an upper volume having a substantially elliptical cross section, and;
a lower volume integrated with the upper volume as a single main volume in an interior pressurized cabin, said lower volume having a cross section extending laterally into a wing to body fairing.

14. The aircraft passenger cabin as defined in claim 13 wherein a cross section of the lower volume is substantially rectangular.

15. The aircraft passenger cabin as defined in claim 13 wherein the cross section of the lower volume extends laterally at least the width of a major axis of the substantially elliptical upper cross section.

16. The aircraft passenger cabin as defined in claim 13 wherein the cross section of the lower volume extends laterally beyond the width of a major axis of the substantially elliptical upper cross section.

17. The aircraft passenger cabin as defined in claim 13 having a substantially flat floor extending laterally at least the width of a major axis of the substantially elliptical cross section of the upper volume.

18. The aircraft passenger cabin as defined in claim 13 wherein a major axis of the elliptical cross section is at least two times a minor axis.

* * * * *